United States Patent [19]

Boisvert

[11] 3,777,332

[45] Dec. 11, 1973

[54] APPARATUS FOR EXTRACTING CRAB MEAT

[76] Inventor: Albert E. Boisvert, Maswansicut Lake Dr., North Scituate, R.I.

[22] Filed: Jan. 17, 1972

[21] Appl. No.: 218,182

[52] U.S. Cl. .................................................. 17/71
[51] Int. Cl. ............................................ A22c 29/00
[58] Field of Search .................................. 17/71, 53

[56] References Cited
UNITED STATES PATENTS

| 3,256,556 | 6/1966 | Anderson et al. | 17/71 |
| 3,325,856 | 6/1967 | Pack et al. | 17/71 |

Primary Examiner—Robert Peshock
Attorney—Elliot A. Salter et al.

[57] ABSTRACT

Apparatus for squeezing meat from the claws and flippers of cooked hard shell crabs and for preparing the body for further processing. A supporting frame is provided with a conveyor belt. Dividing strips on the frame, above the belt, divide the surface into a plurality of narrow longitudinal lanes and a single comparatively wide lane along one side edge. Claws and flippers are conveyed along the narrow lanes which keep them in a generally longitudinal attitude. The body of the crab, minus the shell, is conveyed in the wider lane at one side. At the end of the belt, a plurality of rotating guide fingers pass the parts from the conveyor to a pair of rollers which squeeze the meat from the claws and flippers, the meat dropping into a suitable receptacle. The rollers are provided with narrow diameter portions at one end in alignment with the wider lane for receiving the body. At this point the rollers are provided with staggered studs which crush and chew up the membrane-covered body portions, the pieces dropping into a brine solution for further processing. The upper roller is resiliently urged against the lower roller to provide for flexibility in handling different thicknesses of crab parts.

9 Claims, 8 Drawing Figures

3,777,332

APPARATUS FOR EXTRACTING CRAB MEAT

BACKGROUND OF THE INVENTION

In handling Chesapeake Bay type crabs, the cooked crab is dismembered, the carapace is removed, and the crab meat is extracted from the claws and flippers and the membrane covered body. The art is replete with comparatively complex machines for automatically accomplishing some or all of the necessary operations.

The present invention provides a comparatively simple apparatus for extracting the meat from the cooked and dismembered claws and flippers and for masticating the membrane-covered body to prepare it for further processing.

SUMMARY OF THE INVENTION

Basically, the present invention provides for an endless belt conveyor which has its surface area divided into narrow strips or lanes. These lanes serve to orient the dismembered claws and flippers so that they move in a substantially longitudinal direction. One side of the conveyor is provided with a comparatively wide lane for handling the wider and thicker body.

The meat is extracted by squeezing the claws and flippers between a pair of rollers, one of which is resiliently urged against the other. Means are provided for positively passing the crab parts from the end of the conveyor belt to the rollers. In alignment with the wide lane of the conveyor, the rollers are provided with a portion of reduced diameter to provide a wide gap for receiving the thick body. At this point, the rollers are provided with staggered studs which masticate the membrane-covered bodies into small sections which drop into a container of brine. The bodies may be further processed by agitating the brine to separate the meat from the membrane. The meat extracted from the claws and flippers drops into a suitable bin beneath the rollers.

DESCRIPTION OF THE DRAWINGS

In the drawings which illustrate the best mode presently contemplated for carrying out the present invention.

DESCRIPTION OF THE INVENTION

Figure 1:
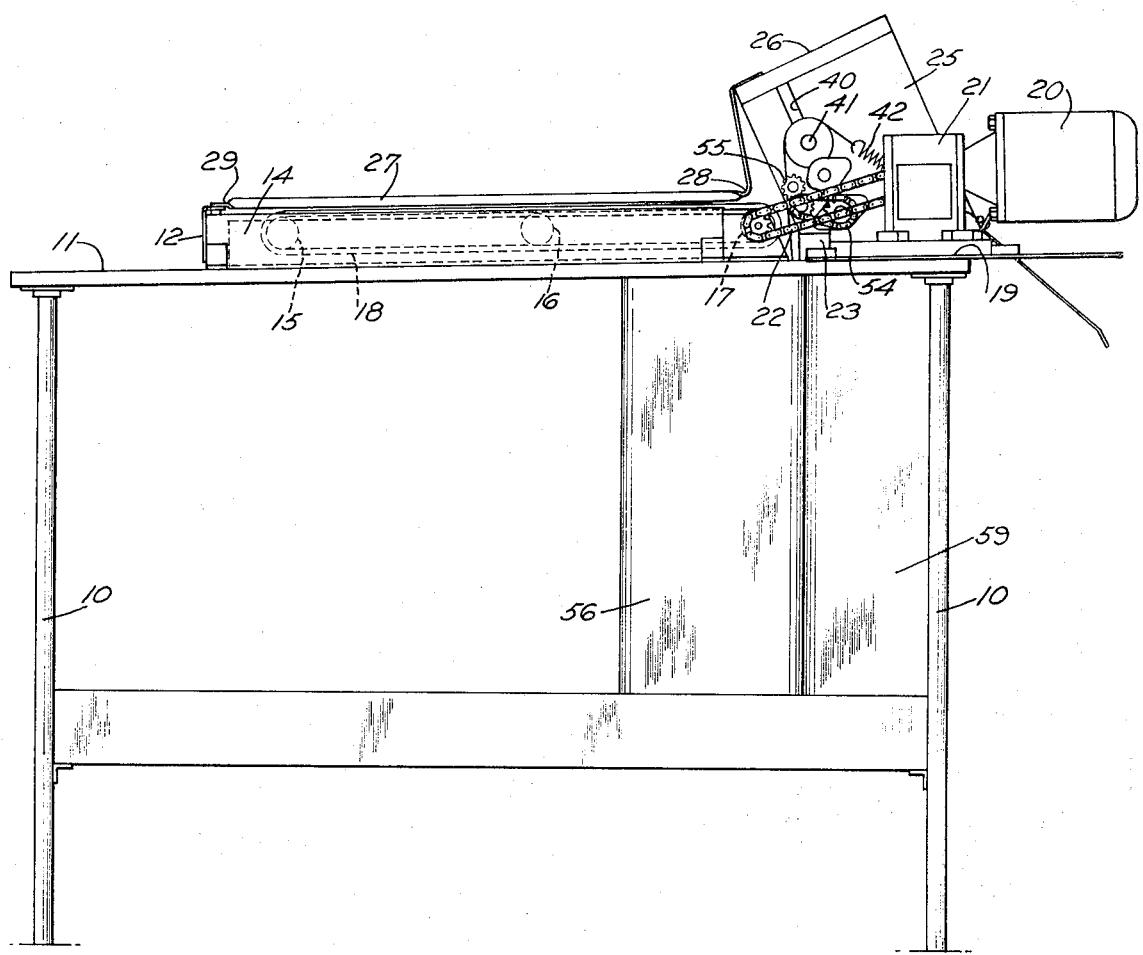
FIG. 1 is a side elevation of a machine embodying my present invention.

The apparatus of the present invention is illustrated as mounted on a table having vertical legs 10 on which a rectangular table top 11 is mounted. The rear legs 10 may be slightly longer than the front legs to provide an upward angle to the top 11 as shown in FIG. 1. Mounted on the table top 11, spaced from the perimeter, is a rectangular three sided frame comprising a front vertical wall portion 12, and side wall portions 13 and 14. There is no rear wall portion. A roller 15 is mounted transversely between the sides 13 and 14 adjacent the front wall 12. A second idler roller 16 is similarly mounted intermediate the ends of the side walls 13 and 14, and a drive roller 17 is mounted at the rear of the walls 13 and 14. An endless conveyor belt 18 extends around the rollers 15 and 17 and is supported by the idler roller 16.

Figure 2:
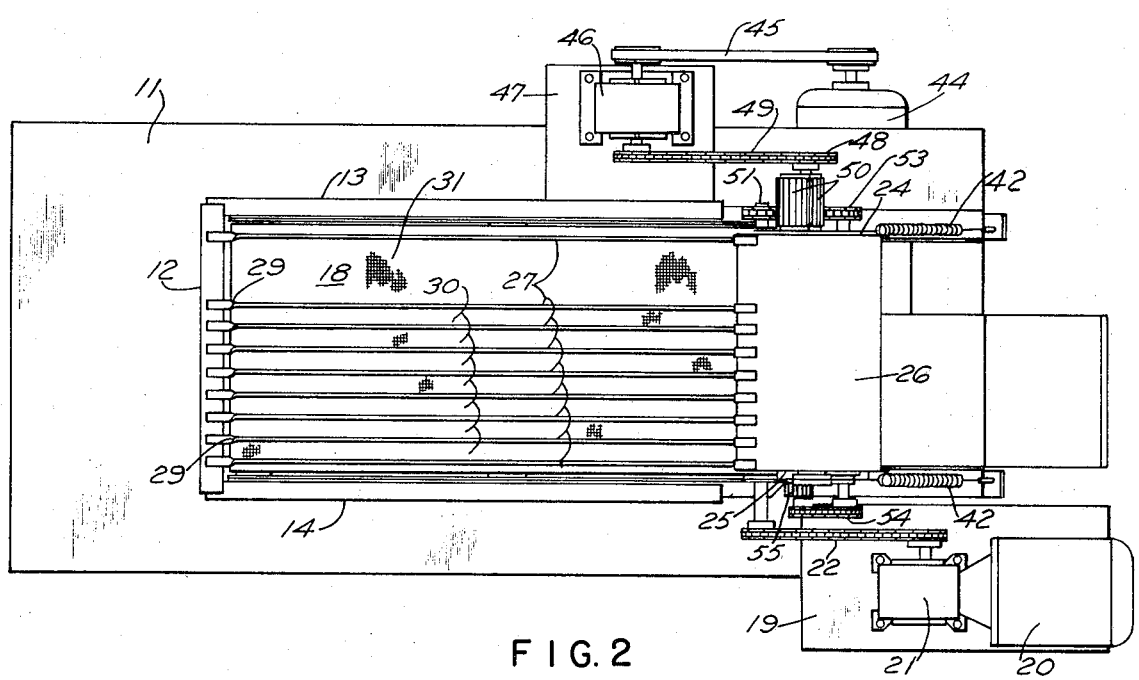
FIG. 2 is a top plan view thereof.

The belt 18 is driven as shown in FIGS. 1 and 2. An auxiliary support 19 is mounted at the corner of the table top 11. A motor 20 and gear drive 21 are mounted on the auxiliary support 19. A chain drive 22 connects the gear drive 21 with a sprocket wheel at the end of the roller 17.

Figure 3:
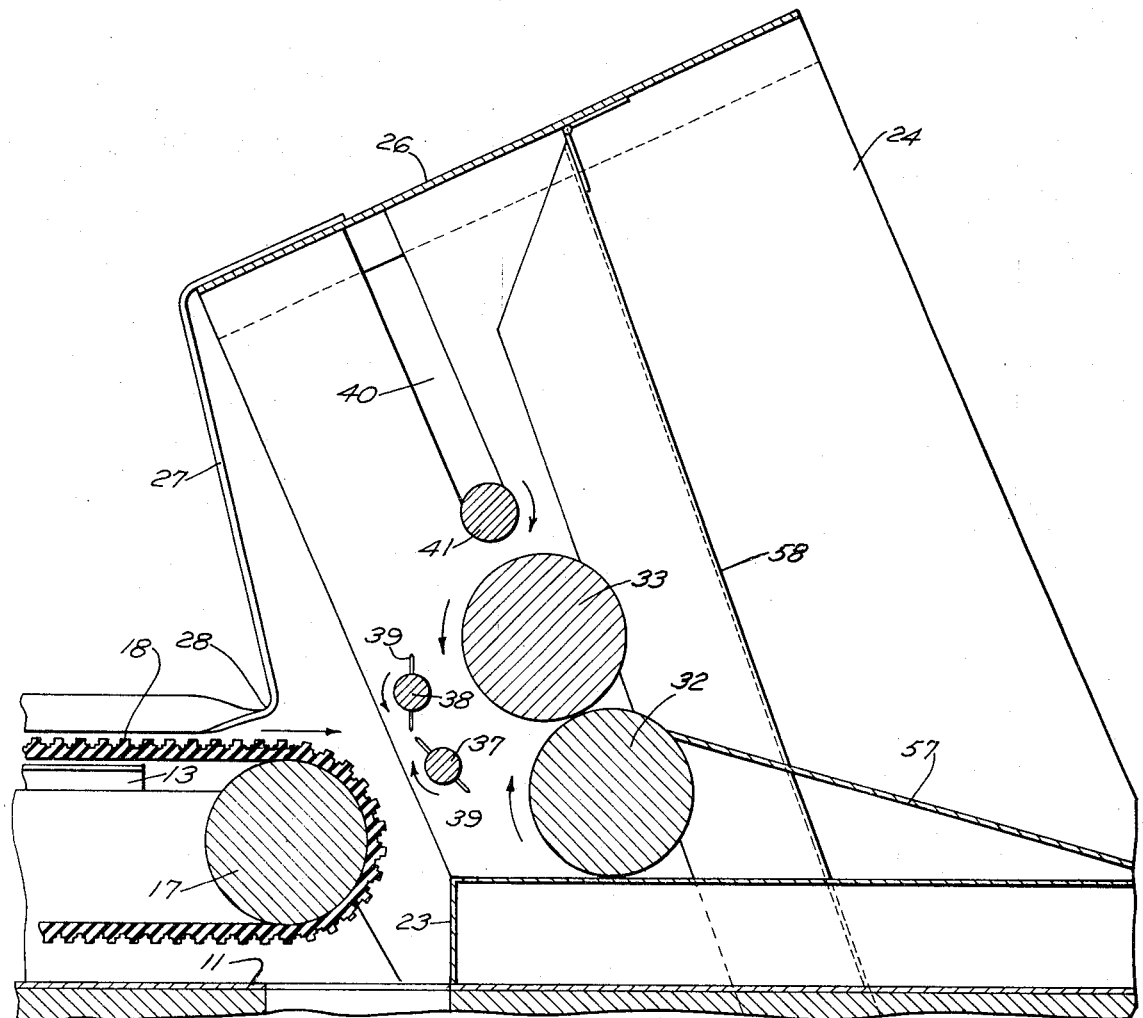
FIG. 3 is an enlarged longitudinal section through the squeeze rollers, guide pins and conveyor.
Figure 4:
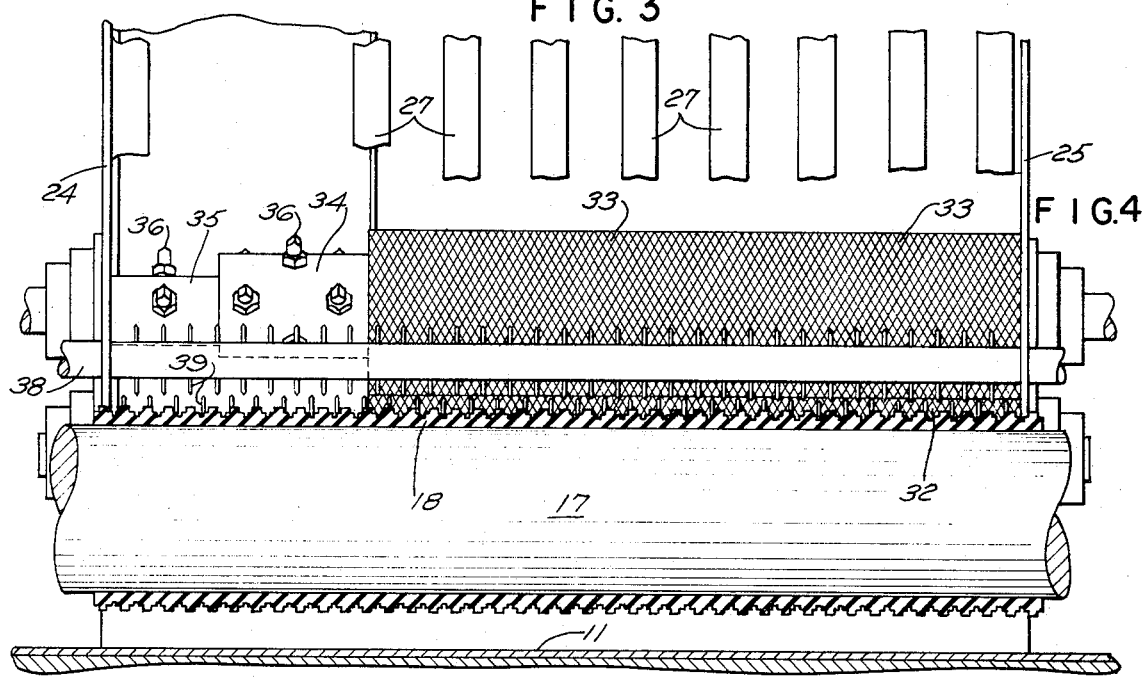
FIG. 4 is an enlarged transverse section through the conveyor in front of the squeeze rollers.

Mounted just rearwardly of the belt drive roller 17 on the top 11 is a housing having a base 23, spaced side walls 24 and 25 and a top 26. As can be seen in FIGS. 1 and 3, the side walls 24 and 25 are biased so that the housing tilts forwardly over the rear end of the conveyor belt 18. A plurality of metal strips 27 are supported between the housing top 26 and the front wall 12, see FIGS. 1 and 2. Each strip 27 extends from the top 26 downwardly to a point just above the belt 18. Here, at 28, each strip is twisted 90° to extend vertically across the top of the belt 18. At the front ends, the strips 27 are again twisted at 29 to flatten over the top of the front wall 12. Viewing FIG. 2, this construction produces a plurality of narrow lanes 30 longitudinally of the conveyor belt 18. At the left edge, several strips are omitted to provide a wide lane 31.

Figure 7:
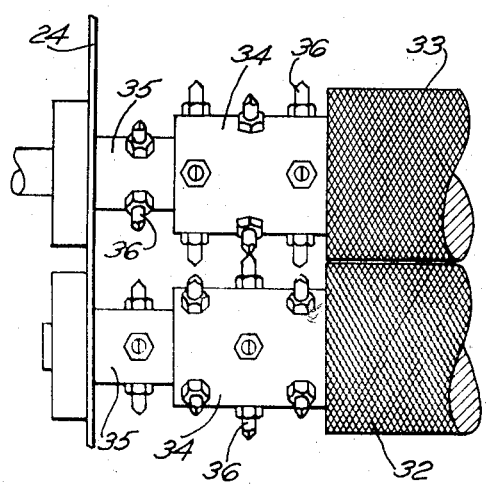
FIG. 7 is a fragmentary section taken on line 7—7 on FIG. 6.
Figure 8:
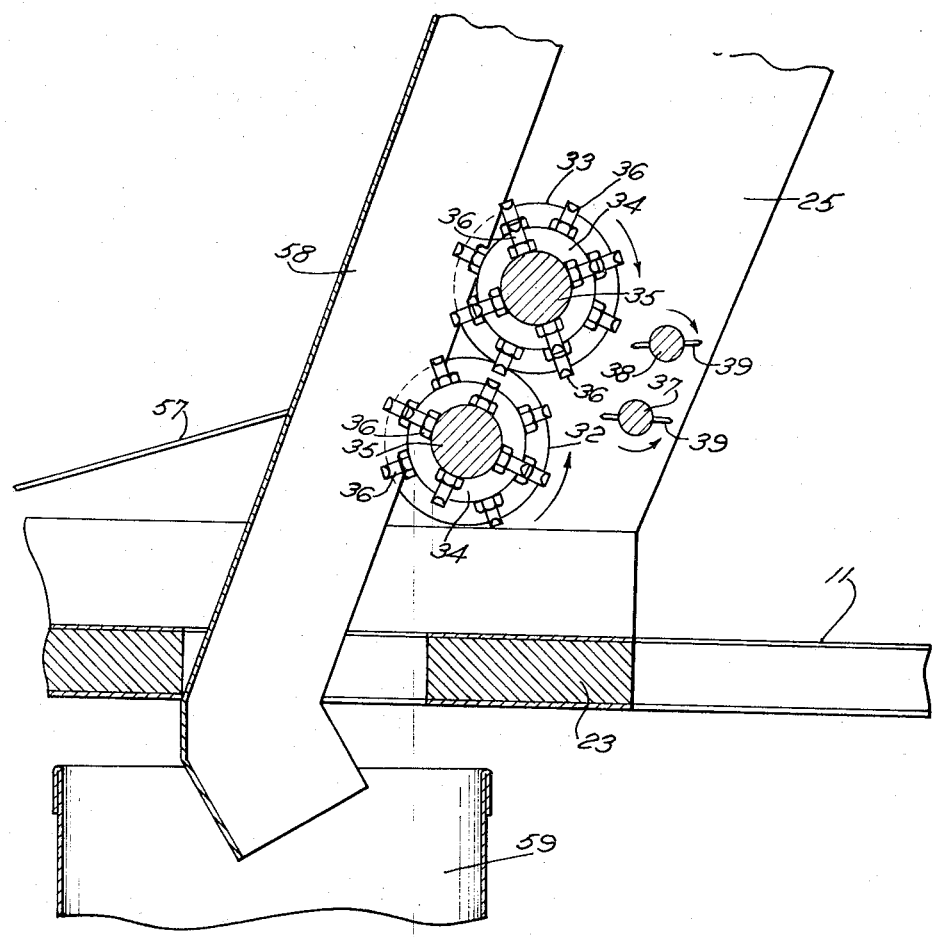
FIG. 8 is a view similar to FIG. 6 showing the housing and meat collecting system in section.

I now provide a pair of squeeze rollers 32 and 33 journalled in the housing walls 24 and 25. The lower roller 32 is mounted slightly above the level of the belt 18, see FIG. 3, and the upper roller 33 is mounted above and slightly forwardly of the roller 32 so that a line through their centers is parallel to the edges of the housing walls 24 and 25. The surfaces of the rollers 32 and 33 are preferably knurled. As can be seen in FIG. 7, the left ends of the rollers 32 and 33 are provided with portions of reduced diameters 34 adjacent the body portions and still smaller diameters 35 adjacent the outer ends. The portions 34 and 35 are provided with raised studs 36 mounted in staggered relation to each other. The wide lane 31 is designed to handle the thick body portions and the thickest portions are placed close to the outer edge so that they enter the larger opening at the roller portion 35.

Figure 5:
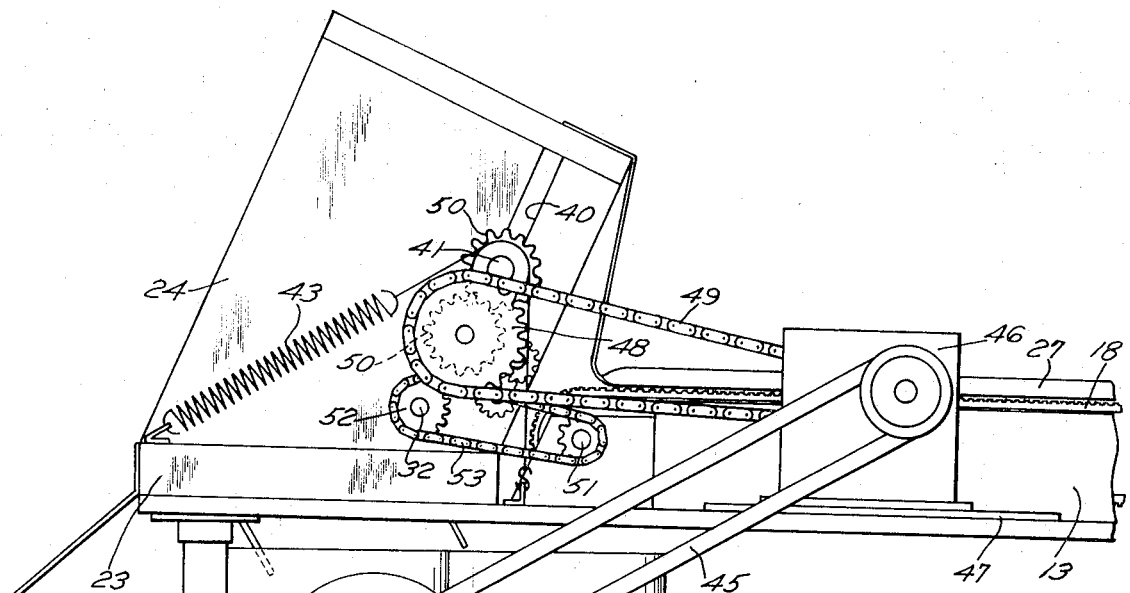
FIG. 5 is an enlarged side elevation of the machine on the side opposite FIG. 1.
Figure 6:
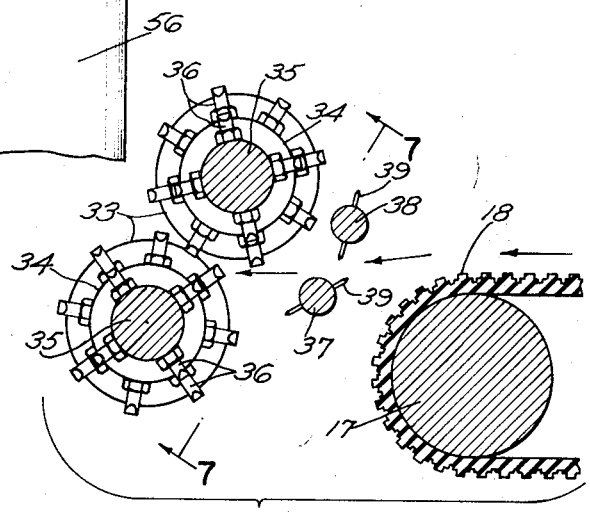
FIG. 6 is an end view of the squeeze rollers and guide pins taken from the side shown in FIG. 5.

Now, as can be seen in FIGS. 3, 4, 6 and 8, I provide a pair of shafts 37 and 38 mounted in front of the rollers 32 and 33 and between the rollers and the end of the conveyor belt 18. The shafts 37 and 38 are provided with transverse pins 39 extending through the shafts. The pins 39 are designed to engage the crab parts as they leave the conveyor belt 18 and direct them between the rollers 32 and 33. To provide resiliency to the squeezing operation of the rollers 32 and 33, the upper roller 33 is loosely mounted for limited movement in its bearings. The housing walls 24 and 25 are provided with opposed vertical slots 40, FIGS. 1, 3 and 5. A shaft 41 extends through the slots and is provided with gears at each end which mesh with and bear down on meshing gears at the ends of the roller shaft 33. The shaft 41 is resiliently held in downward position by a spring 42 having its ends anchored to the table top 11 and extending over the end of the right side of the shaft 41, FIG. 1, and a spring 43 on the left end, FIG. 5.

There are therefore five shafts or rollers which must be driven as illustrated in FIG. 3 in the directions shown by the arrows. A motor 44 is mounted below the table top 11 and drives a belt 45 and gear 46. The gear 46 is mounted on an auxiliary support 47. The upper roller 33 is provided at the end of its shaft with a sprocket wheel 48 which is driven through a chain 49 from the gear drive 46. The gears 50 then connect at each end of the shaft 41 with gears on the roller shaft 33 as hereinabove described. The lower roller 32 and the shafts 37 and 38 are all driven by the motor drive 20 and gear drive 21. The conveyor drive roller 17 is mounted on a driven shaft which extends on the left side at 51. A sprocket is mounted on the end and is connected to a sprocket 52 on the end of the lower roller shaft 32 by a chain 53. Now back to the right side, FIGS. 1 and 2, the shaft for the lower roller 32 is provided with a sprocket chain drive 54 for driving the lower pin shaft 37. The shafts 37 and 38 are here connected by meshing gears 55 so that the lower shaft 37 drives the upper shaft 38 in the opposite direction.

With the above arrangement, the motor 20 and gear 21 drive the conveyor shaft 17, the lower roller 32, and the shafts 37 and 38. The motor 44 and gear 46 drives the upper roller 33 and the resilient shaft 41.

In operation, the crab is cooked and dismembered to remove the claws and flippers or legs and to remove the carapace from the membrane-covered body meat. The claws and legs are placed in the narrow lanes 30 which serve to retain them in substantial longitudinal position so that they will properly align when they enter the rollers 32 and 33. The rollers squeeze the crabmeat from the claws and flippers with the meat dropping in front of the rollers into a receptacle 56, FIG. 1, and the scrap shell parts passing between the rollers and along the baffle plate 57, FIG. 3, and out the rear of the machine. The body passes through the roller portions 34 or 35 to be chewed up into pieces. These are deflected by a baffle 58 into a receptacle 59. The receptacle 59 may contain brine which is later agitated by apparatus (not shown) to separate the membrane from the meat.

I have thus provided a comparatively simple device for extracting the crabmeat from the claws and flippers of a Chesapeake Bay type crab and for preparing the body for further processing. The device is easy to operate and easy and economical to manufacture and assemble. Other advantages of the present invention will be readily apparent to a person skilled in the art.

I claim:

1. An apparatus for extracting crab meat from the body, claws and flippers of a cooked crab, comprising a support, a conveyor belt mounted on said support, a housing mounted on said support adjacent one end of said conveyor belt, a pair of rollers mounted in said housing adjacent the end of said conveyor belt, means for guiding the crab parts from said conveyor belt to said rollers whereby said rollers squeeze the crab meat from the claws and flippers, and drive means for said conveyor belt, rollers and guiding means, said rollers being of substantially cylindrical configuration and having a reduced diameter cylindrical section at one end, said section defining an enlarged space for receiving membrane-covered crab bodies, and means in said section for chewing up the crab bodies into small pieces.

2. An apparatus in claim 1, wherein the surface above said conveyor belt is divided into a plurality of spaced parallel lanes for retaining the claws and flippers in proper position on said conveyor belt for entering between said rollers.

3. An apparatus for extracting crab meat from the body, claws and flippers of a cooked crab, comprising a support, a conveyor belt mounted on said support, a housing mounted on said support adjacent one end of said conveyor belt, a pair of rollers mounted in said housing adjacent the end of said conveyor belt, means for guiding the crab parts from said conveyor belt to said rollers whereby said rollers squeeze the crab meat from the claws and flippers, and drive means for said conveyor belt, rollers and guiding means, said crab guiding means comprising a pair of spaced parallel shafts mounted in said housing parallel to said rollers and between said rollers and the adjacent end of said conveyor belt, said shafts having a plurality of transverse guide pins, said shafts rotating in opposite directions whereby said guide pins engage the crab parts and guide them into said rollers.

4. An apparatus for extracting crab meat from the body, claws and flippers of a cooked crab, comprising a support, a conveyor belt mounted on said support, a housing mounted on said support adjacent one end of said conveyor belt, a pair of rollers mounted in said housing adjacent the end of said conveyor belt, means for guiding the crab parts from said conveyor belt to said rollers whereby said rollers squeeze the crab meat from the claws and flippers, and drive means for said conveyor belt, rollers and guiding means, the surface above said conveyor belt being divided into a plurality of spaced parallel lanes for retaining the claws and flippers in proper position on said conveyor belt for entering between said rollers, said lanes being formed by a plurality of metal strips mounted above the surface of said conveyor belt, each of said strips having one end mounted on said housing adjacent one end of said conveyor belt and the other end mounted above said support adjacent the other end of said conveyor belt.

5. An apparatus for extracting crab meat from the body, claws and flippers of a cooked crab, comprising a support, a conveyor belt mounted on said support, a housing mounted on said support adjacent one end of said conveyor belt, a pair of rollers mounted in said housing adjacent the end of said conveyor belt, means for guiding the crab parts from said conveyor belt to said rollers whereby said rollers squeeze the crab meat from the claws and flippers, and drive means for said conveyor belt, rollers and guiding means, one end portion of said rollers being provided with a reduced diameter section for receiving membrane-covered crab bodies, and means in said section for chewing up the crab bodies into small pieces, said chewing means comprising a plurality of studs mounted on said reduced diameter section in staggered relation to each other.

6. An apparatus for extracting crab meat from the body, claws and flippers of a cooked crab, comprising a support, a conveyor belt mounted on said support, a housing mounted on said support adjacent one end of said conveyor belt, a pair of rollers mounted in said housing adjacent the end of said conveyor belt, means for guiding the crab parts from said conveyor belt to said rollers whereby said rollers squeeze the crab meat from the claws and flippers, and drive means for said conveyor belt, rollers and guiding means, the surface above said conveyor belt being divided into a plurality of spaced parallel lanes for retaining the claws and flippers in proper position on said conveyor belt for entering between said rollers, one end portion of said rollers being provided with a reduced diameter section for receiving membrane-covered crab bodies, and means in said section for chewing up the crab bodies into small pieces.

7. An apparatus as in claim 6, wherein said crab guiding means comprises a pair of spaced parallel shafts mounted in said housing parallel to said rollers and between said rollers and the adjacent end of said conveyor belt, said shafts having a plurality of transverse guide pins, said shafts rotating in opposite directions whereby said guide pins engage the crab parts and guide them into said rollers.

8. An apparatus as in claim 6, wherein said lanes are formed by a plurality of metal strips mounted above the surface of said conveyor belt, each of said strips having one end mounted on said housing adjacent one end of said conveyor belt and the other end mounted above said support adjacent the other end of said conveyor belt.

9. An apparatus as in claim 7, wherein said lanes are formed by a plurality of metal strips mounted above the surface of said conveyor belt, each of said strips having one end mounted on said housing adjacent one end of said conveyor belt and the other end mounted above the support adjacent the other end of said conveyor belt.

* * * * *